US008556501B2

(12) United States Patent
Topham et al.

(10) Patent No.: US 8,556,501 B2
(45) Date of Patent: Oct. 15, 2013

(54) MINI-CELL, ON-ORBIT, TEMPERATURE RE-CALIBRATION APPARATUS AND METHOD

(75) Inventors: Troy Shane Topham, Nibley, UT (US); Gail Bingham, Hyde Park, UT (US); Harri Latvakoski, Hyde Park, UT (US); Michael Sean Watson, North Logan, UT (US); Vern Alan Thurgood, Providence, UT (US)

(73) Assignee: Utah State University Research Foundation, North Logan, UT (US)

( * ) Notice: Subject to any disclaimer, the term of this patent is extended or adjusted under 35 U.S.C. 154(b) by 295 days.

(21) Appl. No.: 13/014,027

(22) Filed: Jan. 26, 2011

(65) Prior Publication Data
US 2011/0125444 A1  May 26, 2011

Related U.S. Application Data

(63) Continuation-in-part of application No. 12/482,622, filed on Jun. 11, 2009.

(60) Provisional application No. 61/060,753, filed on Jun. 11, 2008.

(51) Int. Cl.
*G01K 15/00* (2006.01)
(52) U.S. Cl.
USPC .................................................. 374/2; 374/3

(58) Field of Classification Search
USPC .......................................................... 374/2, 3
See application file for complete search history.

(56) References Cited

U.S. PATENT DOCUMENTS

| | | | | |
|---|---|---|---|---|
| 3,267,956 A | * | 8/1966 | Kline | 137/360 |
| 6,232,614 B1 | * | 5/2001 | Christy et al. | 250/504 R |
| 7,119,337 B1 | * | 10/2006 | Johnson et al. | 250/339.13 |
| 7,511,274 B2 | * | 3/2009 | Johnson et al. | 250/338.1 |
| 8,067,738 B1 | * | 11/2011 | Heath et al. | 250/338.1 |
| 2007/0221848 A1 | * | 9/2007 | Johnson et al. | 250/339.02 |

* cited by examiner

*Primary Examiner* — Lisa Caputo
*Assistant Examiner* — Jamel Williams

(57) ABSTRACT

A method for on-orbit calibration of the temperature sensors of a blackbody is disclosed. The method may include selecting a blackbody traveling in a micro-gravity environment and comprising a sensor, a container positioned proximate the sensor and containing a material, and a heat transfer device positioned proximate the at least one container. The heat transfer device may transition the material through a phase change. The temperature sensor may monitor the temperature of the material during the phase change. Additionally, the state of the material may be measured by displacement of the container to improve the accuracy of the plateau temperature measurement. A correction may be calculated to correct any disparity between the temperature reported by the temperature sensor during the phase change and the known plateau temperature, measured at a threshold state of the material, corresponding to that phase change. The correction may be applied to subsequent temperature readings obtained using the temperature sensor.

21 Claims, 11 Drawing Sheets

Phase Transition Temperatures

| Substance | Temperature (K) |
|---|---|
| In | 429.7485 |
| Ga | 302.9146 |
| GaZn | 298.5 |
| GaSn | 293.5 |
| GaIn | 288.5 |
| H$_2$O | 273.15 |
| Hg | 234.32 |

Figure 8

MINI-CELL, ON-ORBIT, TEMPERATURE RE-CALIBRATION APPARATUS AND METHOD

RELATED APPLICATIONS

This application is a continuation-in-part of co-pending U.S. patent application Ser. No. 12/482,622 filed Jun. 11, 2009, entitled "Mini-Cell, On-Orbit, Temperature Re-Calibration Apparatus and Method" which claims the benefit of U.S. Provisional Patent Application Ser. No. 61/060,753 filed Jun. 11, 2008, both of which are hereby incorporated by reference.

BACKGROUND

1. The Field of the Invention

This invention relates to infrared (IR) instruments and, more particularly, to novel systems and methods for long-term, in-flight calibration of IR instruments.

2. The Background Art

IR instruments must periodically be calibrated in order to provide data of desired or required accuracy. However, the accuracy and stability of temperature sensors used in such calibration procedures can be affected by numerous factors. For example, measurement systems using on-board blackbodies as reference points are subject to temperature sensor drift.

Factors affecting the performance of a temperature sensor may include sensor configuration and type. Other factors may include the thermal environment in which a temperature sensor operates, shock or vibration experienced by a temperature sensor, the nature of the thermal contact between a temperature sensor and a source or blackbody, strain in connecting wires, self heating, and age of a temperature sensor. Any of these factors may cause drift and necessitate re-calibration.

In the past, to better understand the behavior of a temperature sensor, testing has been performed in the environment in which the temperature sensor will operate. Multiple cycles over the range of operation have been used to establish drift rates and the noise characteristic for particular temperature sensors. Accordingly, manufacturers can publish average drift rates for their temperature sensors. These drift rates are, at best, typically about 25 mK/year.

Manufacturers often recommend that temperature sensors be re-calibrated yearly. However, calibration may be performed more or less frequently based on performance, requirements, and environment. IR instruments measuring climate conditions typically have expected lifetimes of seven to ten years in orbit. Accordingly, re-calibration of IR instruments is a necessity.

Current methods for compensating for drift include cross correlation of sensor data with that of other instruments viewing the same Earth scene. This Simultaneous Nadir Overpass (SNO) method allows offsets between instruments to be corrected, but does not allow absolute calibration. What is needed is a system providing a long-term, in-flight, calibration system, particularly one that may be relied upon as consistent and absolute.

SUMMARY OF THE INVENTION

In view of the foregoing, in accordance with the invention as embodied and broadly described herein, a method and apparatus are disclosed in one embodiment of the present invention as including a temperature calibration system based on the melting or solidification of one or more phase-change materials (PCMs). The system may include a cell containing a phase-change material placed in contact with a radiant portion of the blackbody. The cell may be heated such that the phase-change material contained therewithin passes through a phase change.

In selected embodiments, a heat transfer device (e.g., heater, thermoelectric cooler (TEC)) located between the cell and the radiant portion of the blackbody may be used to heat or cool the phase-change material to effect the phase change. One or more temperature sensors (e.g., thermistors, platinum resistance thermometers (PRTs)) to be calibrated may record the temperature change with time and identify the temperature plateau corresponding to the phase change. Additionally, the state of the material may be measured by displacement of the container, thus a more precise plateau temperature may be measured at a threshold state of the material, corresponding to that phase change.

The phase change temperature recorded during solidification (i.e., freezing) and the phase change temperature recorded during melting are material properties that do not change. Thus, either the melting or freezing temperature may be used as a calibration reference for any temperature sensors monitoring the phase-change.

This may be done by comparing the known phase-change temperature to the actual reading or readings collected from the temperature sensors. A calibration correction or offset may be calculated to correct any deviation between the known phase-change temperature and the measured and consequently recorded phase-change temperature. This correction may then be applied to future readings collected from the corresponding temperature sensors.

In selected embodiments, one temperature sensor may be used to calibrate another. For example, a second temperature sensor to be calibrated may be located proximate a radiant portion of a blackbody. The temperature of a blackbody may be monitored. When the temperature reaches a steady state, the cell of phase-change material and the radiant portion of the blackbody are in thermal equilibrium. Accordingly, a first temperature sensor located proximate the cell should indicate the same temperature as a second temperature sensor located proximate the radiant portion.

Because the cell of phase-change material is used to calibrate the first temperature sensor, its output may be trusted. Accordingly, the temperatures reported by the first and second temperature sensors may be compared. A calibration correction or offset may be calculated to correct any deviation between the temperature reported by the first temperature sensor and the temperature reported by the second temperature sensor. This correction may then be applied to future readings collected from the second temperature sensor.

BRIEF DESCRIPTION OF THE DRAWINGS

The foregoing and other objects and features of the present invention will become more fully apparent from the following description and appended claims, taken in conjunction with the accompanying drawings. Understanding that these drawings depict only typical embodiments of the invention and are, therefore, not to be considered limiting of its scope, the invention will be described with additional specificity and detail through use of the accompanying drawings in which:

FIG. 8 is a table illustrating the phase transition temperature of selected materials that may be used as phase-change materials in accordance with the present invention;

DETAILED DESCRIPTION OF SELECTED EMBODIMENTS

Figure 1:
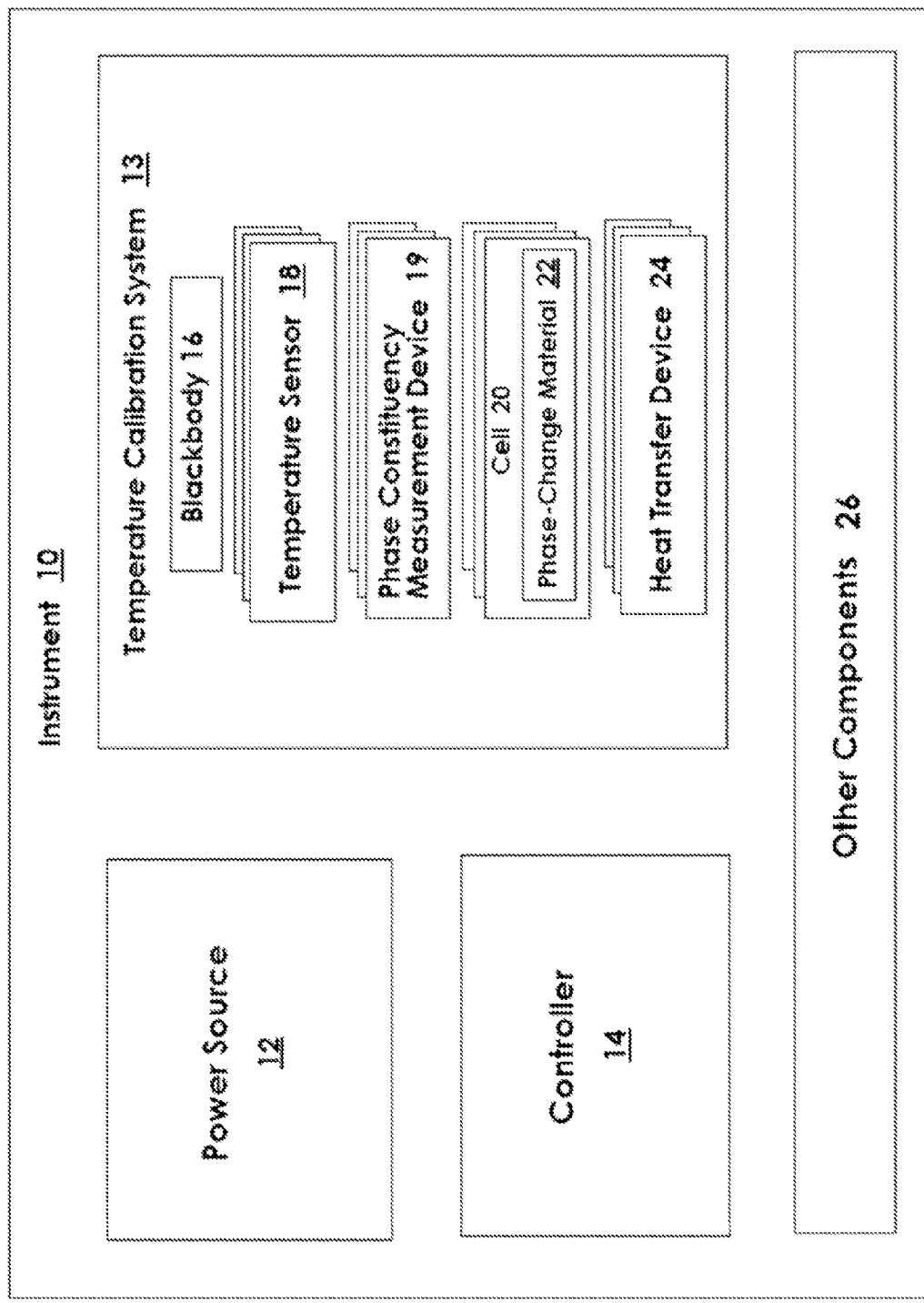
FIG. 1 is a schematic block diagram of an embodiment of an instrument in accordance with the present invention.

It will be readily understood that the components of the present invention, as generally described and illustrated in the drawings herein, could be arranged and designed in a wide variety of different configurations. Thus, the following more detailed description of the embodiments of the system and method of the present invention, as represented in the drawings, is not intended to limit the scope of the invention, but is merely representative of various embodiments of the invention. The illustrated embodiments of the invention will be best understood by reference to the drawings.

Referring to FIG. 1, an instrument 10 in accordance with the present invention may include various sub-components as desired or required. For example, an instrument 10 may include a power source 12 for supplying the various components of an instrument 10 with the electrical power they need. Additionally, an instrument 10 may include a controller 14 comprising one or more computers operably connected and programmed to control operation of the instrument 10.

In general, an instrument 10 must be well characterized to make scientific measurements of high accuracy and low uncertainty. Accordingly, for instruments 10 placed in orbit, calibration and validation are part of the entire process of instrument design, construction, and flight. For example, testing of an IR instrument 10 occurs prior to launch, and again when the IR instrument 10 begins on-orbit operations. IR instruments 10 are often used to collect climate measurements. Because climate measurements must be collected over long periods of time, the stability and repeatability of IR instruments 10 can be extremely important.

Ground and initial on-orbit testing, while important, are not adequate for long duration measurements. Accordingly, an IR instrument 10 must periodically view a source 16 of known radiance to be re-calibrated and maintain accuracy and uncertainty within acceptable levels. Such sources 16 are often blackbodies 16. Accordingly, "source" and "blackbody" typically refer to the same thing.

Unfortunately, the temperature sensors 18 of a blackbody 16 may be subject to drift. With the passage of time, temperature sensors 18 that are not re-calibrated report with less accuracy and certainty the temperature of the blackbody 16. These inaccuracies and uncertainties are passed to any instrument 10 using the blackbody 16 as a reference point.

Embodiments of the present invention enable the temperature sensors 18 of a blackbody 16 to be re-calibrated during on-orbit operations. Properly calibrated blackbodies 16 may then be used to re-calibrate an instrument 10 during on-orbit operations. So calibrated, an instrument 10 may collect accurate measurements over long periods of time.

To achieve very high accuracy, an instrument 10 in accordance with the present invention may balance parameters that affect it, mitigate various effects when possible, and characterize or quantify the effects that are beyond control. In selected embodiments, a temperature calibration system 13 in accordance with the present invention may include a blackbody 16 and one or more cells 20 or containers 20 containing a quantity of phase-change material (PCM) 22. The phase-change material 22 may form part of an absolute-temperature, reference system or standard. A phase constituency measurement device 19 is employed to monitor the state of the phase-change material 22.

To transition a phase-change material 22 through a phase change, a temperature calibration system 13 may include one or more heat transfer devices 24. A heat transfer device 24 may be positioned and configured to heat or cool one or more cells 20 containing phase-change material 22.

In addition to the components 12, 14, 16 discussed hereinabove, an instrument 10 in accordance with the present invention may include other components 26 as desired or necessary.

Figure 2:
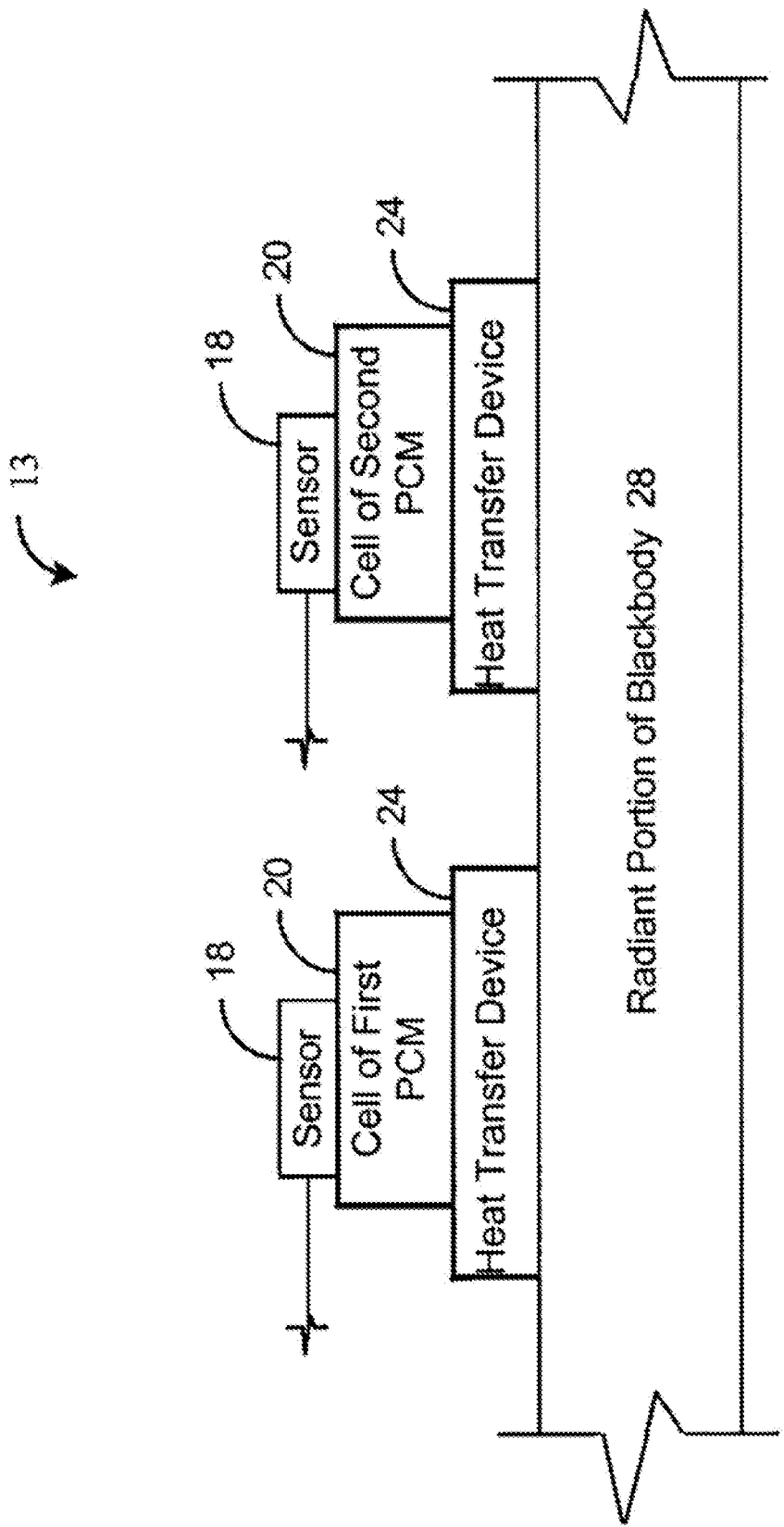
FIG. 2 is a schematic block diagram of one embodiment of a phase-change calibration system in accordance with the present invention applied to a blackbody.
Figure 3:
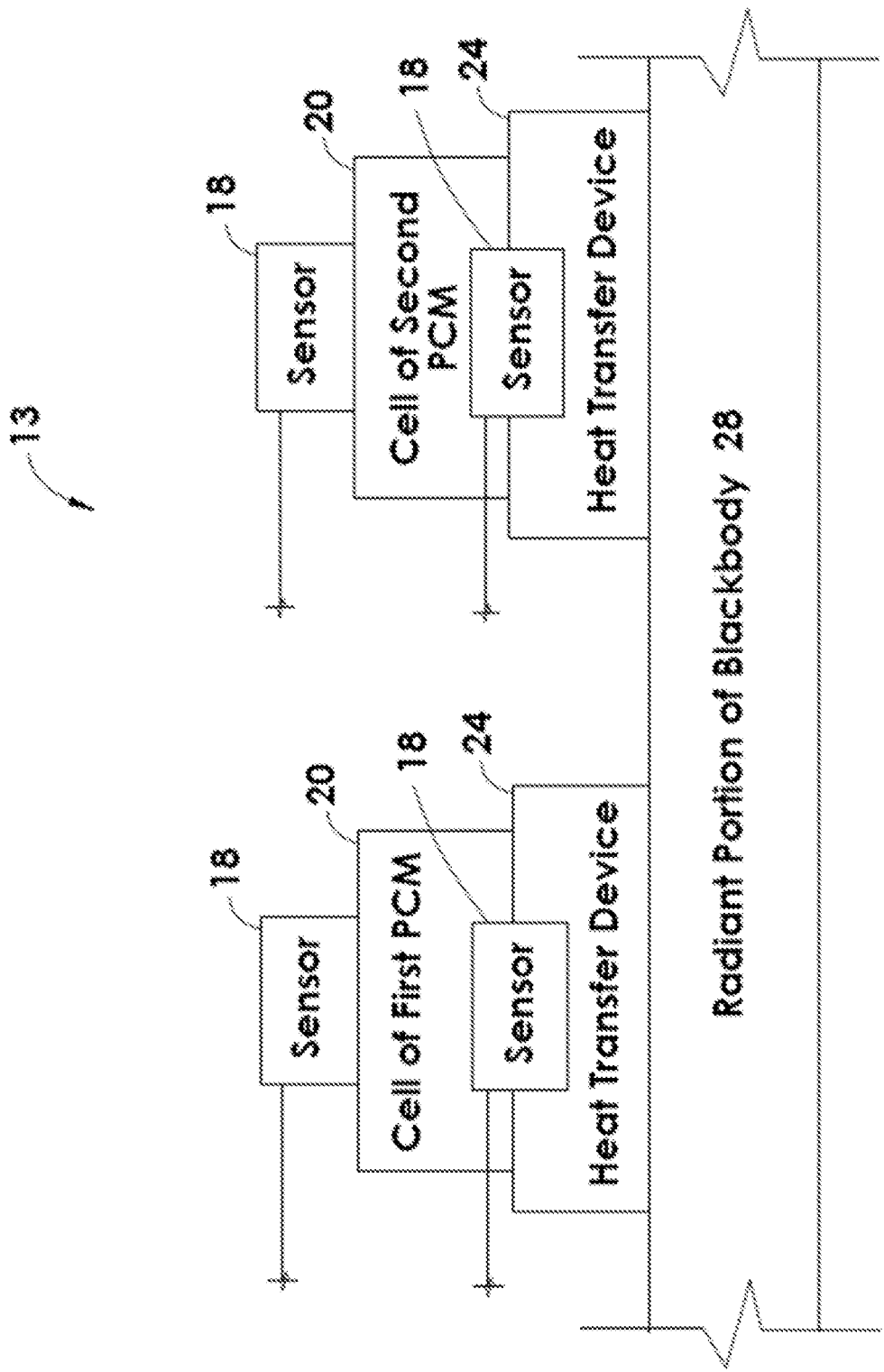
FIG. 3 is a schematic block diagram of another embodiment of a phase-change calibration system in accordance with the present invention applied to a blackbody.

Referring to FIG. 2, direct re-calibration of the temperature sensor 18 or sensors 18 may be accomplished by making thermal contact between the blackbody's radiant portion 28, body 28, surface 28, cavity 28, or the like (i.e., the portion of the blackbody 16 viewed by the instrument 10 during calibration) and one or more cells 20 containing phase-change material 22. The temperature sensor 18 or sensors 18 may be positioned to track the temperature of the phase-change material 22 contained within the cells 20. In selected embodiments, a temperature sensor 18 may be located externally with respect to a cell 20, yet be thermally connected to it. Additionally, as shown in FIG. 3 two temperature sensors 18 can be placed in thermal contact with a cell 20 such that the first temperature sensor is adjacent to the heat transfer device 24 and the second temperature sensor 18 is opposite the heat transfer device 24, such that the thermal flux into the phase-change material 22 can be measured.

During normal operation, the temperature of a temperature sensor 18 may closely follow or track the temperature of a cell 20 and the contents 22 thereof. During the re-calibration, a cell 20 (with its temperature sensor 18 or sensors 18) may be heated or cooled across the phase transition of the phase-change material 22 contained within the cell 20. Once a temperature sensor 18 has been re-calibrated and returned to thermal equilibrium with a blackbody 16, its response or output may be transferred to or become the output of the blackbody 16.

In selected embodiments, one or more heat transfer devices 24 may form the thermal interface between a cell 20 and the radiant portion 28 of a blackbody 16. In such embodiments, the only significant conductive thermal path from the cell 20 to the radiant portion 28 may be through the heat transfer device 24. Accordingly, the temperature of a cell 20 may be controlled substantially independently from the temperature of the radiant portion 28 of the blackbody 16. This may support calibration of the temperature sensors 18 while the blackbody 16 remains near its operational temperature.

One or more heat transfer devices 24 of a blackbody 16 in accordance with the present invention may be configured as thermoelectric coolers (TEC) 24. A thermoelectric cooler 24 may create a heat flux at the junction of two different types of materials. In general, a thermoelectric cooler 24 may be a solid-state heat pump that consumes electrical energy in transferring heat from one side thereof to the other.

A typical, unpowered thermoelectric cooler 24 may have a thermal conductivity of from about one to about two Watts per milli-Kelvin (W/mK). This thermal conductivity is roughly the same as glass and ceramic. Accordingly, when a thermoelectric cooler 24 is positioned between a cell 20 and the rest of the blackbody 16, and the cell 20 is adequately insulated from external heat loads, the temperature of the cell 20 may track the temperature of the blackbody 16 within a few milli-Kelvin (mK).

A temperature calibration system 13 in accordance with the present invention may include one or more cells 20. The cells 20 of the temperature calibration system 13 may each contain the same phase-change material 22 or a different phase-change material 22. Alternatively, more than one cell 20 may contain a first phase-change material 22, while other cells 20 contain other phase-change materials 22. For example, the temperature calibration system 13 may include two cells 20 containing a first phase-change material 22 and two cells 20 containing a second phase-change material 22.

Figure 4:
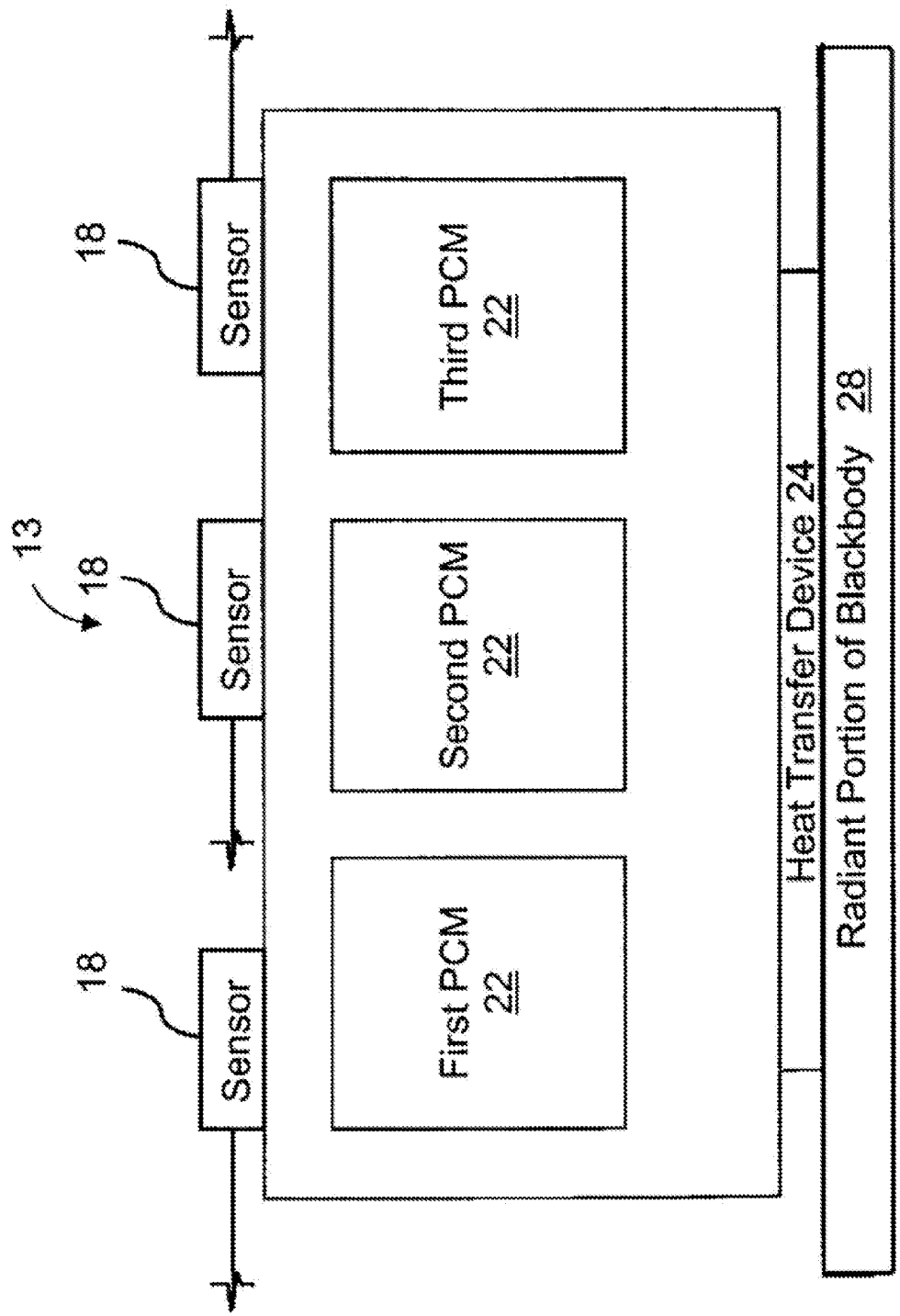
FIG. 4 is a schematic block diagram of another embodiment of a phase-change calibration system in accordance with the present invention applied to a blackbody.

Referring to FIG. 4, in certain embodiments, one or more cells 20 containing phase-change material 22 may be incorporated into the temperature calibration system 13. In such embodiments, the temperature calibration system 13 may be cycled over the calibration temperature range (i.e., a range containing the phase transition temperatures of the various phase-change materials 22 contained within the embedded cells 20). To accomplish this cycling, a heat transfer device 24 (e.g., heater, thermoelectric cooler 24) may thermally connect a blackbody 16, or the radiant portion of the blackbody 28 to a heat sink forming part of the instrument 10. Thermal energy may be pushed to or pulled from the system as needed.

Cycling a blackbody 16 over the entire calibration temperature range may require removal of the blackbody 16 from use by the IR instrument 10 for a significant period of time (e.g., days). Alternatively, certain phase-change materials 22 comprising metal eutectics may be used. Such materials 22 may have phase-transition temperatures within or near the operational temperature range of a blackbody 16 in accordance with the present invention. Accordingly, in such embodiments, even a system comprising one or more cells 20 may be used by an instrument 10 during calibration of the blackbody 16.

Figure 5:
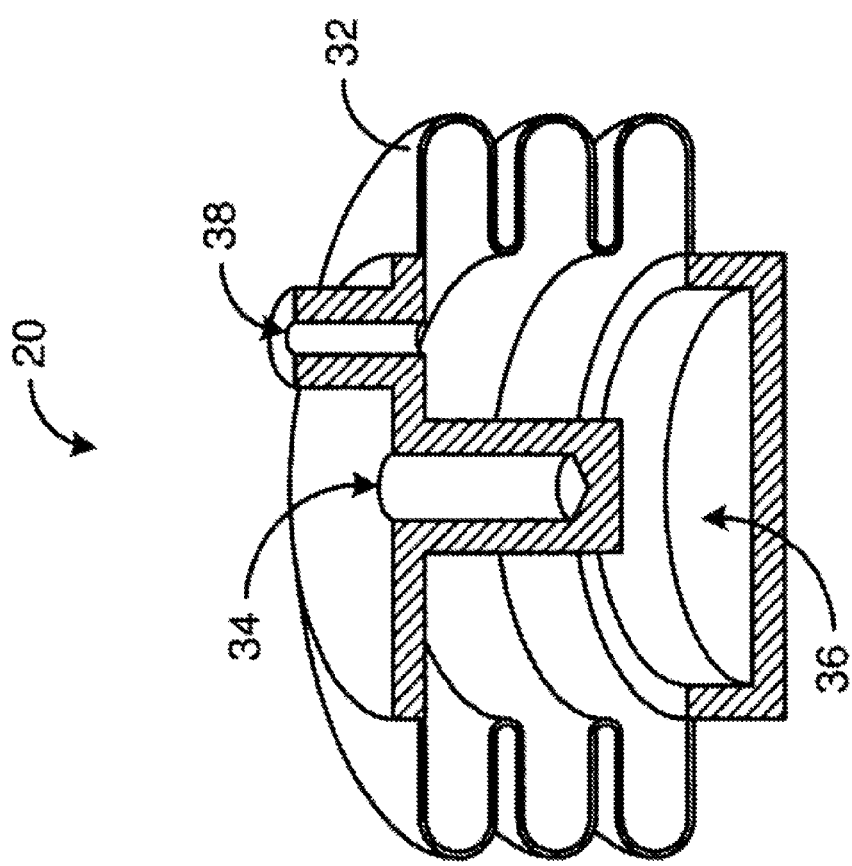
FIG. 5 is a cut-away, perspective view of one embodiment of a container for housing a phase-change material in accordance with the present invention.

Referring to FIG. 5, a cell 20 in accordance with the present invention may have any suitable configuration. In selected embodiments, smaller cells 20 may have certain advantages over larger ones. On orbit, power is not unlimited. Moreover, the more an instrument 10 weighs, the more costly it typically is to place in orbit. Smaller cells 20 may require less electrical power to cycle through the entire calibration temperature range. Additionally, smaller cells 20, and the smaller amount of phase-change material 22 they contain, may simply weigh less.

In selected embodiments, a cell 20 may be formed to accommodate and measure expansion and contraction of the phase-change material 22. For example, in certain embodiments, a cell 20 may be formed with one or more gussets 32. The gussets 32 may provide regions of increased flexibility, permitting a cell 20 to change in volume to accommodate an expanding or shrinking phase-change material 22.

In other embodiments, a cell 20 may be a bellow container in which the displacement resulting from the volume change of the phase-change material 22 is measured. In another embodiment, the cell 20 may be designed with a diaphragm cap that is displaced as the phase-change material 22 expands or shrinks. The measurement of the force on the diaphragm cap can is related to the volume change of the phase-change material 22. In yet another embodiment, the cell 20 may be a closed container with the phase-change material 22 and a compressible gas inside such that when the phase-change material 22 undergoes a phase change, the measured gas pressure is associated with the change in volume of the phase-change material 22.

A cell 20 in accordance with the present invention may include various features to improve its performance. For example, a cell 20 may include a cavity 34 extending from the exterior of the cell 20 toward the interior 36 thereof. A temperature sensor 18 may be placed and secured within the cavity 34. Such a configuration may effectively envelope the temperature sensor 18 within the phase-change material 22.

A cell 20 may have other features as desired or necessary. For example, in selected embodiments, a cell 20 may include an aperture 38 or opening 38 providing access to the interior 36 of the cell 20. The aperture 38 may be used to place a phase-change material within the cell 20. Once the cell 20 is filled, the aperture 38 may be closed or sealed.

Figure 6:
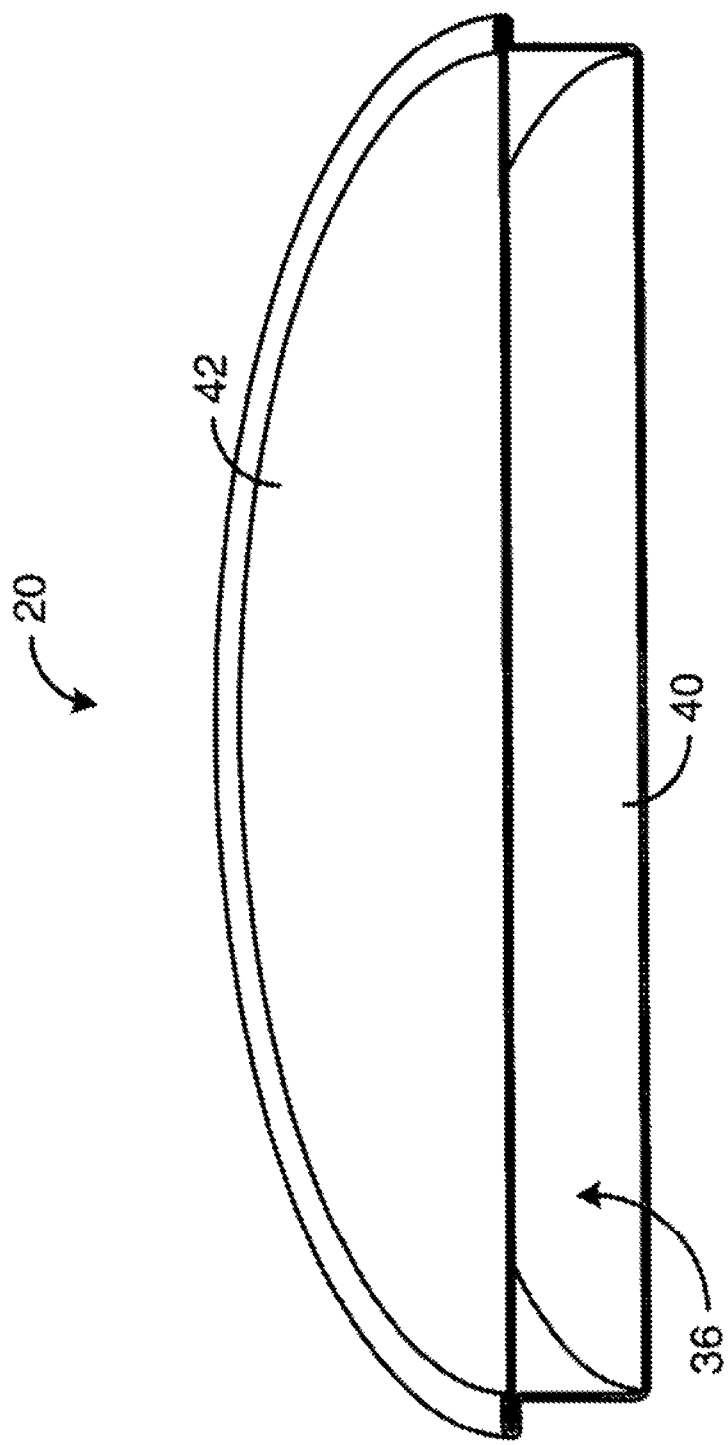
FIG. 6 is a cut-away, perspective view of another embodiment of a container for housing a phase-change material in accordance with the present invention.

Referring to FIG. 6, a cell 20 in accordance with the present invention may include various features to improve performance and manufacturability. In selected embodiments, a cell 20 may be formed of a base 40 and a lid 42. In such embodiments, the base 40 and lid 42 may be formed to facilitate securement and sealing therebetween. For example, a base 40 and lid 42 may be formed to accept a seal wherein one is folded over and crimped against the other in a canning-type seal. In other embodiments, welding (e.g., ultrasonic welding, spin welding, etc.) may be used to connect a base 40 to a lid 42.

Another method for monitoring the expansion and contraction of the phase-change material 22 is to mount strain gages on the cell 20 and measure the radial strain from cell deflections. For example, referring to FIG. 6, in one embodiment, a strain gage may be affixed to the lid 42. The strain gage registers the deflection of the lid 42 as the phase-change material 22 expands or contracts during a phase transition.

In certain embodiments, a cell 20 may comprise a sealed pouch formed of flexible material. To accommodate any thermal expansion of the phase-change material 22 contained therewithin, the pouch may transition from a comparatively flatter profile to a more rounded profile. Such a pouch may be secured to a radiant portion 28 and temperature sensor 18 in any suitable arrangement. In one embodiment, a clamp may hold a temperature sensor 18 in contact with a pouch and hold the pouch against the radiant portion 28. The clamp may be formed in such a manner as to minimize or eliminate thermal losses or loads that would otherwise be imposed thereby.

Figure 7:
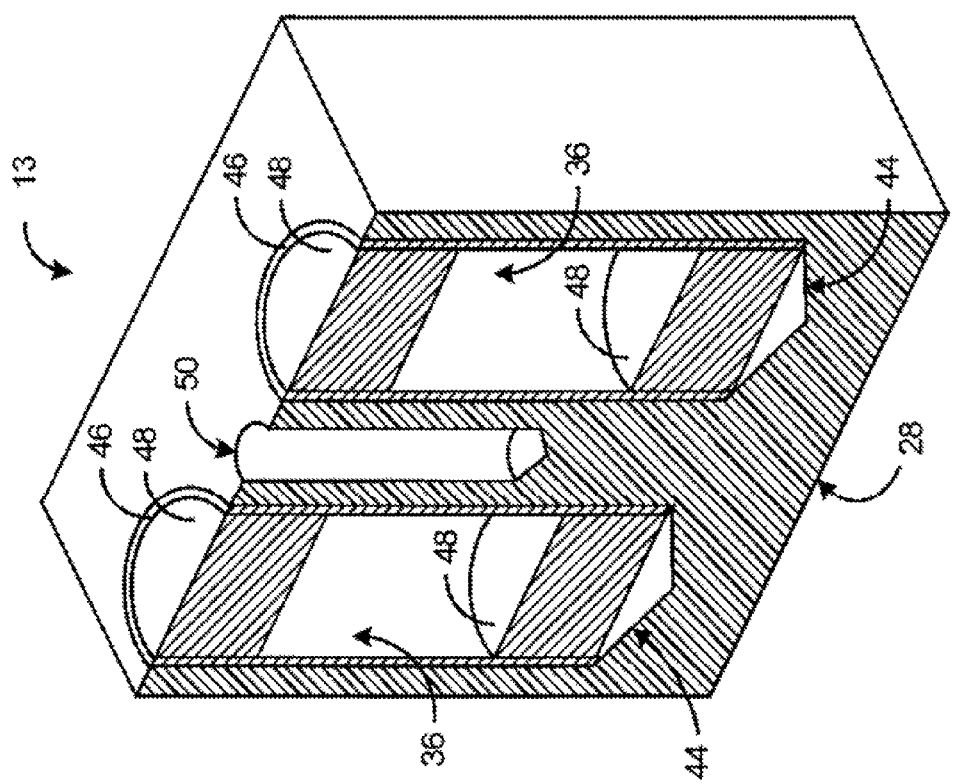
FIG. 7 is a cut-away, perspective view of one embodiment of a container for housing multiple phase-change materials in accordance with the present invention.

Referring to FIG. 7, in selected embodiments, a cell 20 in accordance with the present invention may comprise an insert embedded within a portion of a temperature calibration system 13. For example, in one embodiment, an aperture 44 may be machined within a portion of the system. A cell 20 having a size and shape corresponding to the aperture 44 may be inserted therewithin.

For example, an aperture 44 may be substantially cylindrical in shape. A cell 20 placed within the aperture 44 may have a corresponding or matching cylindrical shape. If desired or necessary, a filler or interface material (e.g., thermal grease) may be placed between a cell 20 and the corresponding aperture 44 to improve the heat transfer therebetween.

In selected embodiments, a cylindrical cell 20 may comprise a tube 46 sealed at each end with a closure 48. Certain closures 48 may be formed as a monolithic extension of the tube 46 (e.g., be left to seal one end of the tube 46 during a manufacturing process). Other closures 48 may engage a tube 46 with threads, glue, welding (e.g., ultrasonic welding, spin welding, etc.), or the like. Collectively, the tube 46 and closures 48 may form an enclosure containing a phase-change material 22.

A cell 20 in accordance with the present invention may be formed of any suitable material or materials. In certain embodiments, a cell 20 may comprise a hermetically sealed, "fluorocarbon-lined" (e.g., TEFLON™) container. This may prevent contamination of the phase-change material and provide an absolute reference that will not change with time. For example, in selected embodiments, a tube 46 and corresponding closures 48 may be formed of a fluorocarbon polymer.

In selected embodiments, it may be desirable for a single temperature sensor 18 to monitor the temperature of multiple cells 20. Accordingly, a temperature calibration system 13 may be formed to provide that particular temperature sensor 18 with a direct thermal path to those multiple cells 20. For example, in one embodiment, a cavity 50 may be formed at a location between two cells 20. A temperature sensor 18 may be placed and secured within the cavity 50. Such a configuration may permit the temperature sensor 18 to effectively monitor the temperature of both cells 20.

In selected embodiments, it may be desirable, in addition to temperature measurements, to measure the state of the phase-change material 22, i.e. the phase constituency, which is the percent of the phase-change material 22 in a solid state and the percent in a liquid state at any given time during a phase transition. Accordingly, a temperature calibration system 13 may be formed to include a phase constituency measurement device 19 for measurement of the state of phase-change materials 22 either by displacement of the cell 20, or strain measurements of the cell 20, electrical conductivity of the phase-change material 22 itself, pressure measured within the cell 20, or any other method. For example, referring to FIG. 6, in one embodiment, a strain gage may be affixed to the lid 42. The strain gage registers the deflection of the lid 42 as the phase-change material 22 expands or contracts while transitioning state. The strain measurement can be calibrated such that its output corresponds to the phase constituency of the phase change material 22.

Referring to FIG. 8, in selected embodiments in accordance with the present invention, the 70 K span between the melting points of mercury and gallium may be too large to meet operational requirements. For example, relatively large changes in temperature (e.g., between disparate phase-change temperatures) may heat or cool a blackbody 16 excessively. Thus, during calibration exercises using such materials, the blackbody 16 may be unsuitable for use as a reference by an instrument 10. Moreover, greater temperature changes require greater, and perhaps excessive or unavailable, amounts of energy to effect and correct a desired temperature change. Accordingly, in selected embodiments, such materials may be unsuitable for concurrent use as phase-change materials 22 in accordance with the present invention.

To provide temperature points having the most desirable values within the normal operating range of selected instruments 10 (e.g., IR instruments 10), the present invention may employ one or more gallium alloys as phase-change materials. In selected embodiments in accordance with the present invention, phase transitions (from solid to liquid or vice versa) of eutectic gallium alloys, pure gallium, and other substances may provide known, standardized temperatures facilitating re-calibration for the temperature sensor 18 or sensors 18 of a blackbody 16 over the life of a mission.

For selected instruments 10, calibration may require at least two known or standard temperature reference points. In such embodiments, a temperature calibration system 13 containing embedded cells 20 may use gallium and water as the two phase-change materials 22. The solidification temperatures for these two materials may be reached without significant overcooling in small cells 20. Moreover, for an IR instrument 10 with a typical aperture, temperatures between 273 K and 303 K need not take the blackbody 16 out of the dynamic operating range of the instrument 10.

In other embodiments, a temperature calibration system 13 with embedded cells 20 may include three or more temperature references points. Accordingly, in such embodiments, other materials 22 providing one or two alternative eutectic points may be used. Use of these alternative materials 22 may provide an array of close, fixed, transition temperatures that may maintain the blackbody 16 close to an optimal temperature near the maximum of the operating range.

For non-temperature-controlled blackbodies 16, fixed temperature references may be attached thereto, external to the radiant portion 28. A fixed temperature reference near the desired operating temperature and two within plus or minus 15 K of the operating temperature may be preferred. By keeping the mass of the cells 20 providing the fixed reference temperatures small, each may be serially heated or cooled through its phase transition temperature without significantly disturbing the temperature uniformity of the radiant portion 28.

Figure 9:
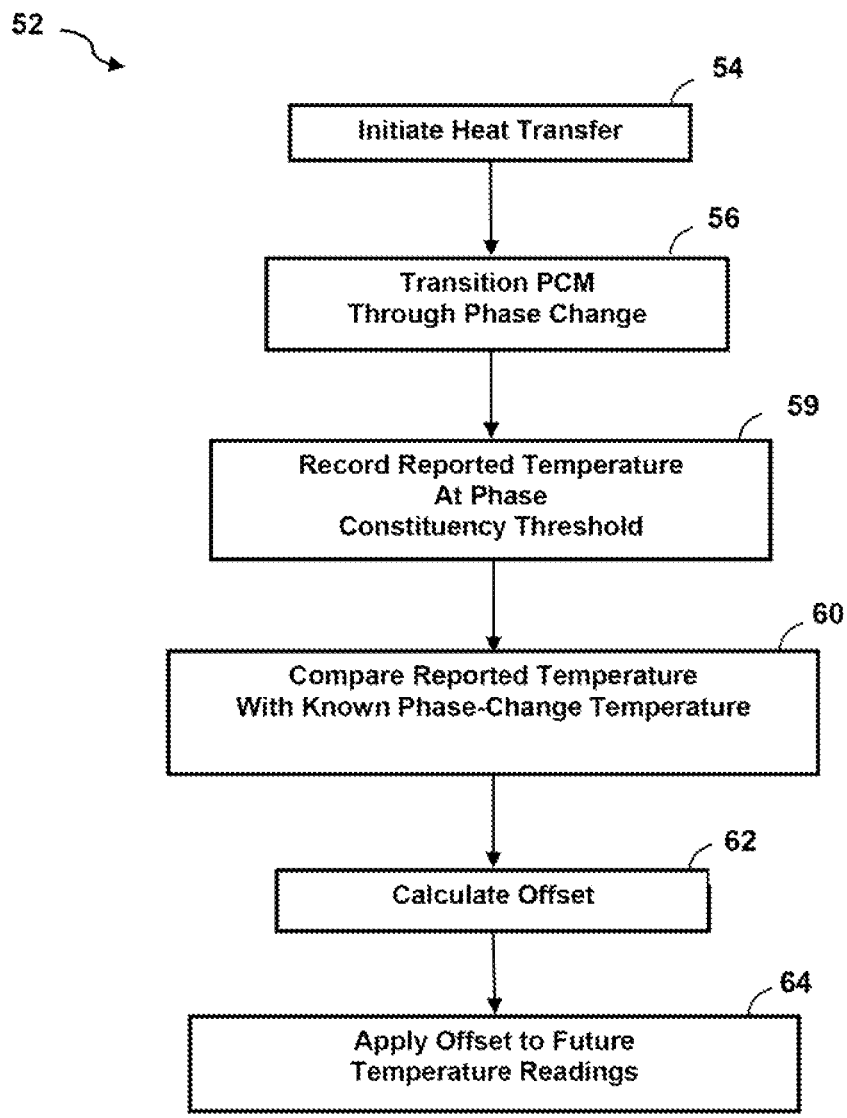
FIG. 9 is a schematic block diagram of one embodiment of a method in accordance with the present invention.

Referring to FIG. 9, to calibrate 52 a temperature sensor 18 of a blackbody 16 using an external cell 20 containing a phase-change material 22, heat may be transferred 54 to or from the phase-change material 22 using a heat transfer device 24 such as a thermoelectric cooler 24. The transfer 54 of heat may transition 56 the phase-change material 22 through a phase change. This may create a response plateau of nearly constant temperature.

Phase constituency measurements can be used to improve the accuracy of the measured plateau temperature. Because the temperature is changing slightly as the phase transition occurs it is difficult to assign an exact temperature to the plateau. With phase constituency measurements it is possible to establish a better defined temperature to be recorded as the phase transition temperature. For example, a specific threshold can be set on the phase constituency of 50% solid. When that phase constituency threshold is reached the temperature of the phase-change material 22 is recorded and reported 59.

Since temporally finite phase transitions require some heat flux to change state, in some embodiments, physical thermal paths will create temperature gradients that will affect the temperature sensors 18 and cause them to read an offset from the phase-change material 22 during transition. This offset can propagate through the calibration process shown in FIG. 9 and result in errors in the final temperature reading calibration and output. All temporally finite phase transitions will be subject to this type of offset. In many cases the offset will be entirely repeatable and simple to account for. In cases where it is not simple to account for, a general slowing of the phase transition or an attempt to reach some long-term equilibrium is desirable to minimize this type of temperature gradient.

In embodiments which measure phase constituency, the constituency measurement can be used as feedback to control the temperature of the phase-change material 22 so that a temperature is reached which allows the indefinite coexistence of the solid and liquid phases of the phase-change material 22. With the phases at equilibrium the temperature will be at equilibrium also and will read the exact fixed point temperature for the phase-change material 22 as defined in the ITS-90 temperature scale without offsets or uncertainty.

The known temperature corresponding to the phase change may then be compared 60 to the actual reading or readings collected 59 from the temperature sensor 18. A calibration correction or offset may then be calculated 62 and applied 64 to future readings collected from the temperature sensor 18.

In embodiments utilizing a heat transfer device 24 such as a thermoelectric cooler 24, power to the thermoelectric cooler 24 may be terminated once the phase-change material 22 has passed through the phase change. Additionally, displacement data for phase constituency measurements may be utilized to provide feedback to the heat transfer device 24. This feedback may be used to control the power to the heat transfer device 24, thus controlling the phase constituency of the phase-change material 22 during a phase transition to maintain a longer temperature reference which results in a reduced measurement error due to gradients from heating or cooling. Accordingly, the cell 20 and phase-change material 22 contained therein may return to an equilibrium temperature. In selected embodiments, any heat removed from the blackbody 16 during the phase change (e.g., melting) of the phase-change material 22 may largely be returned to the blackbody 16. Alternatively, any heat transferred to the blackbody 16 during the phase change (e.g., freezing) of the phase-change material 22 may largely be removed from the blackbody 16.

During re-calibration, the amount of heat added to or removed from the cell 20 may be comparatively small. Accordingly, in selected embodiments, a thermoelectric cooler 24 may pull the heat added to the cell 20 directly from the radiant portion 28 of the blackbody 16. Similarly, a thermoelectric cooler 24 may push directly into the radiant portion 28 of the blackbody 16 the heat pulled from the cell 20. Due to the comparatively small amounts of heat involved, this "pulling" and "pushing," or transferring heat to and from the radiant portion 28 of the blackbody 16 may leave the performance of the blackbody 16 substantially undisturbed.

Figure 10:
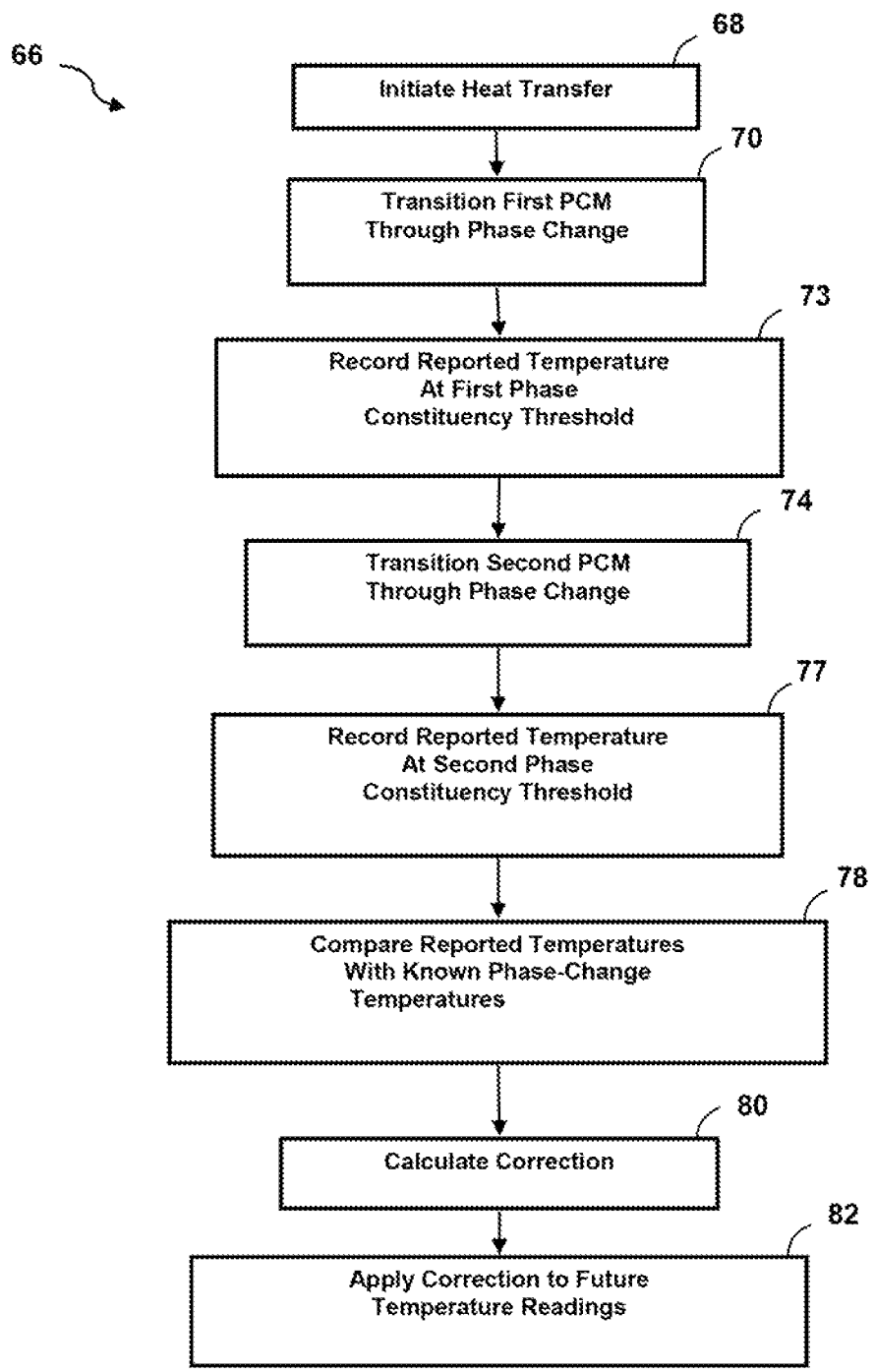
FIG. 10 is a schematic block diagram of another embodiment of a method in accordance with the present invention.

Referring to FIG. 10, calibrations 66 involving multiple phase-change materials 22 may proceed in a manner similar to those 52 involving one phase-change material 22. To begin the process 66, heat may be transferred 68 to or from a first phase-change material 22 using a heat transfer device 24 such as a thermoelectric cooler 24. The transfer 68 of heat may transition 70 the first phase-change material 22 through a phase change. This may create a response plateau of nearly constant temperature. Phase constituency measurements, as described previously, can be used to improve the accuracy of the plateau temperature recorded, thus, when that first phase constituency threshold is reached the temperature of the phase-change material 22 may be recorded 73 by a temperature sensor 18 being calibrated.

These initial steps 68, 70, 73 may be repeated with the other phase-change materials 22. For example, if a temperature calibration system 13 includes a second phase-change material 22, heat may be transferred 68 to or from the second phase-change material 22 using a heat transfer device 24 such as a thermoelectric cooler 24. The transfer 68 of heat may transition 74 the second phase-change material 22 through a phase change. This may create a response plateau of nearly constant temperature. Phase constituency measurements, as described previously, can be used to improve the accuracy of the plateau temperature recorded, thus, when that second phase constituency threshold is reached the temperature of the phase-change material 22 may be recorded 77 by a temperature sensor 18 being calibrated (potentially a different temperature sensor 18 from that monitoring the first phase-change material 22).

The known temperatures corresponding to the phase changes may then be compared 78 to the actual reading or readings collected 73, 77 from the temperature sensor 18 or sensors 18. A calibration correction or offset may then be calculated 80 and applied 82 to future readings collected from the temperature sensor 18 or sensors 18. Accordingly, a blackbody 16 may be calibrated to accurately report temperatures across its operational range.

Figure 11:
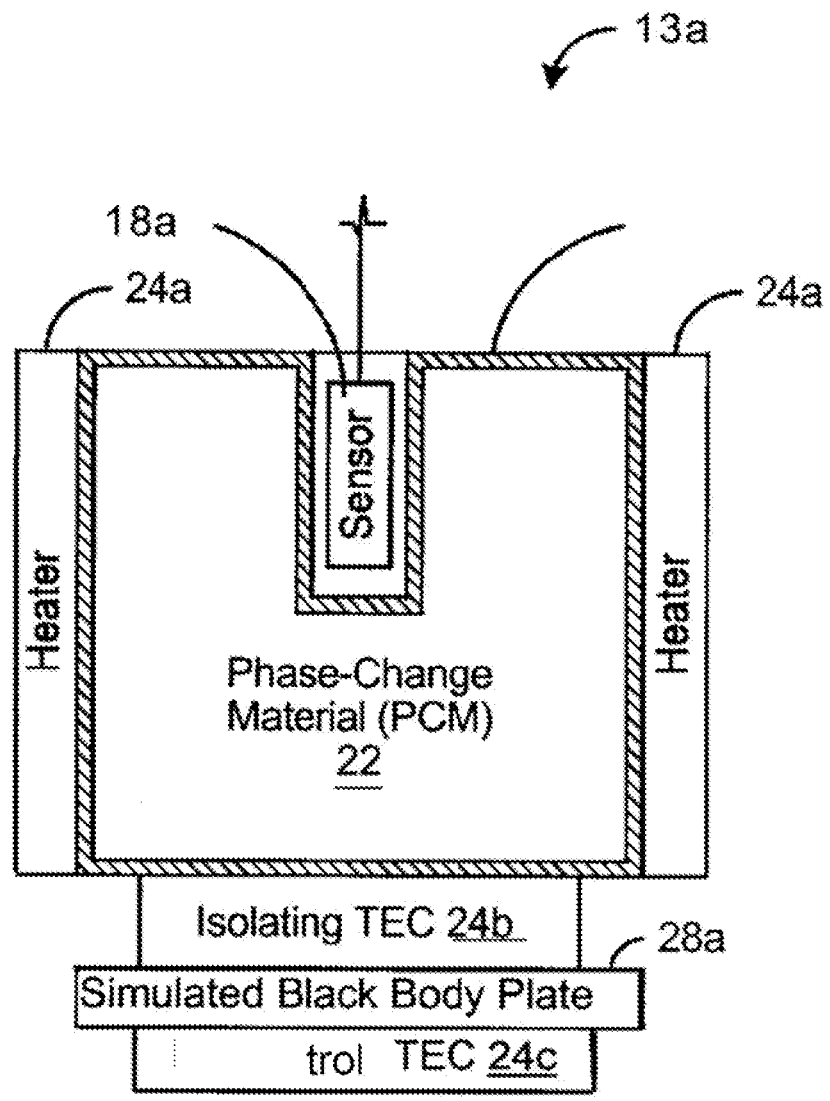
FIG. 11 is a schematic block diagram of a prototype temperature reference module in accordance with the present invention.

In embodiments which do not measure phase constituency but do have multiple temperature measurements another method may be employed to slow the plateau and minimize gradients. This configuration is shown in FIG. 3 in which a second temperature sensor 18 is placed between the cell 20 of the phase-change material and the heat transfer device 24. By subtracting the output of the two sensors 18, it is possible to quantify or at least estimate the thermal flux into the phase change material during a transition. If the temperature of the phase change material 22 were controlled to minimize the difference between the two sensors 18, the resulting value will be very close to the phase equilibrium temperature, thus the temperature recorded by both sensors will be the fixed calibration point for the material. Referring to FIG. 11, a prototype temperature calibration system 13a was built to evaluate certain concepts presented herein. In the prototype 13a, twenty-five grams of a phase-change material 22a were housed in a cell 20a comprising a stainless steel bellows container to accommodate material expansion during phase change. A small thermistor 18a was placed within the well of a stainless steel probe tube to track the temperature of the phase-change material 22a.

The cell 20a was surrounded radially with a resistive heating element 24a and was thermally linked to a thermoelectric cooler 24b on the bottom. The opposite, operative surface of this thermoelectric cooler 24b was attached to a small aluminum plate 28a, acting as the radiant portion 28 of a blackbody 16.

The temperature of the prototype 13a was controlled with another thermoelectric cooler 24c connected to the aluminum plate 28a. The purpose of this dual, thermoelectric-cooler arrangement was to allow simulation of the effects of varying blackbody temperatures on the system. These effects were observed by monitoring the power applied to the heater 24a and the thermoelectric coolers 24b, 24c. To improve the quality of the experiment, the space around the cell 20a was insulated to reduce or eliminate heat flow from sources other than the other components of the prototype 13a.

The experiment showed that the twenty-five grams of phase-change material 22a appeared likely excessive, requiring an undesirably high consumption of power to avoid inducing a temperature anomaly in a small radiant portion 28a. Based on the result of the experiment, it is contemplated that a small cell 20 may complete a 20° C. offset calibration in one hour, while injecting less than 200 mW into the radiant portion 28 of the blackbody 16. The results also indicated that a smaller, comparatively flatter cell 20 may require the use of only one heat transfer device 24 (e.g., thermoelectric cooler 24) to control the temperature of the cell 20. Thus, the radial heater 24a may be unnecessary for homogenous thermal control.

The present invention may be embodied in other specific forms without departing from its fundamental functions or essential characteristics. The described embodiments are to be considered in all respects only as illustrative, and not Wherefore, we claim:

1. A method comprising:
   selecting a blackbody traveling in a micro-gravity environment and
   at least one temperature sensor,
   at least one phase constituency measurement device,
   at least one container positioned proximate said at least one temperature sensor and said at least one phase constituency measurement device and containing a material, and
   at least one heat transfer device positioned proximate said at least one container;
   inducing, by said at least one heat transfer device, said material through a phase change;
   monitoring, during said inducing, a temperature signal output from said at least one temperature sensor;
   monitoring, during said inducing, a phase constituency signal output from said at least one phase constituency measurement device;
   identifying said temperature signal output at the value corresponding to the point at which said phase constituency signal output indicates a threshold value;
   converting said identified temperature signal output into at least one temperature reading;
   calculating a correction correcting a disparity between said at least one temperature reading and a known temperature corresponding to said phase change; and
   executing a first calibration corresponding to said blackbody, said first calibration comprising applying said correction to subsequent temperature readings obtained using said at least one temperature sensor.

2. The method of claim 1, further comprising:
   selecting an instrument traveling with said blackbody in said micro-gravity environment; and
   executing a second calibration corresponding to said instrument, said second calibration comprising sensing the electromagnetic radiation emanating from said blackbody after execution of said first calibration.

3. The method of claim 1, wherein said material comprises metal.

4. The method of claim 3, wherein said material comprises gallium.

5. The method of claim 1, wherein said material comprises a eutectic alloy.

6. The method of claim 5, wherein said material consists of a eutectic alloy.

7. The method of claim 6, wherein said eutectic alloy comprises gallium.

8. The method of claim 1, wherein:
   said blackbody further comprises a radiant portion; and
   said at least one heat transfer device is positioned between said radiant portion and said at least one container such that the only significant conductive thermal path from said at least one container to said radiant portion is through said at least one heat transfer device.

9. The method of claim 1, wherein said at least one temperature sensor is positioned on said at least one container.

10. The method of claim 1, wherein said at least one heat transfer device comprises a thermoelectric cooling device.

11. The method of claim 1, wherein said at least one heat transfer device comprises a heater.

12. The method of claim 1, wherein inducing comprises passing thermal energy from said radiant portion to said at least one container.

13. The method of claim 1, wherein inducing comprises passing thermal energy from said at least one container to said radiant portion.

14. The method of claim 2, wherein said instrument comprises an infrared sensor.

15. The method of claim 1, wherein said at least one temperature sensor comprises a first temperature sensor and a second temperature sensor.

16. The method of claim 15, wherein said at least one container comprises a first container and a second container, said first container containing a first material, said second container containing a second material.

17. The method of claim 16, wherein said at least one heat transfer device comprises a first thermoelectric cooling device and a second thermoelectric cooling device.

18. The method of claim 17, wherein:
   said blackbody further comprises a radiant portion; and
   said first thermoelectric cooling device is positioned between said radiant portion and said first container such that the only significant conductive thermal path from said first container to said radiant portion is through said first thermoelectric cooling device.

19. The method of claim 18, wherein said second thermoelectric cooling device is positioned between said radiant portion and said second container such that the only significant conductive thermal path from said second container to said radiant portion is through said second thermoelectric cooling device.

20. A method comprising:
   selecting a blackbody traveling in a micro-gravity environment and comprising
   at least one temperature sensor,
   at least one phase constituency measurement device,
   first and second containers, said first container containing a first material, said second container containing a second material, and
   at least one heat transfer device;
   inducing, by said at least one heat transfer device, said first material through a phase change thereof;
   inducing, by said at least one heat transfer device, said second material through a phase change thereof;
   deriving, from signal output by said at least one temperature sensor, a first temperature corresponding to said first material during said phase change thereof at a point at which said at least one phase change constituency measurement device identifies a first phase change threshold value, and a second temperature corresponding to said second material during said phase change thereof at a point at which said at least one phase change constituency measurement device identifies a second phase change threshold value;
   calculating a correction correcting a disparity between said first temperature and said second temperature and known temperatures corresponding to said phase change of said first material and said phase change of said second material; and
   executing a calibration corresponding to said blackbody, said calibration comprising applying said correction to subsequent temperature readings obtained using said at least one temperature sensor.

21. A method comprising:
   selecting a blackbody traveling in a micro-gravity environment and comprising
   at least one temperature sensor,
   at least one phase constituency measurement device, first and second containers, said first container containing a first material, said second container containing a second material, and at least one thermoelectric cooling device positioned between said blackbody and said first container and said second container such that the only significant conductive thermal path from said first container and said second container to said blackbody is through said at least one thermoelectric cooling device;

inducing, by said at least one thermoelectric cooling device, said first material through a phase change thereof;

inducing, by said at least one thermoelectric cooling device, said second material through a phase change thereof;

deriving, from a signal output by said at least one temperature sensor, a first temperature corresponding to said first material during said phase change thereof at a point at which said at least one phase change constituency measurement device identifies a first phase change threshold value, and a second temperature corresponding to said second material during said phase change thereof at a point at which said at least one phase change constituency measurement device identifies a second phase change threshold value;

calculating a correction correcting a disparity between said first temperature and said second temperature and know temperatures corresponding to said phase change of said first material and said phase change of said second material;

executing a first calibration corresponding to said blackbody, said first calibration comprising applying said correction to subsequent temperature readings obtained using said at least one temperature sensor;

selecting an instrument traveling with said blackbody in said micro-gravity environment; and executing a second calibration corresponding to said instrument, said second calibration comprising sensing the electromagnetic radiation emanating from said blackbody after execution of said first calibration.

* * * * *